United States Patent
Barefoot et al.

(10) Patent No.: US 11,613,326 B2
(45) Date of Patent: Mar. 28, 2023

(54) TWO-PIECE UPPER CHAIN GUIDE

(71) Applicant: Eko Sport, Inc., Grand Junction, CO (US)

(72) Inventors: Darek C. Barefoot, Grand Junction, CO (US); Scott Winans, Grand Junction, CO (US); Timothy A. Fry, Grand Junction, CO (US); Sean Gregory Mailen, Grand Junction, CO (US)

(73) Assignee: Eko Sport, Inc., Grand Junction, CO (US)

( * ) Notice: Subject to any disclaimer, the term of this patent is extended or adjusted under 35 U.S.C. 154(b) by 64 days.

(21) Appl. No.: 17/386,026

(22) Filed: Jul. 27, 2021

(65) Prior Publication Data
US 2022/0033033 A1     Feb. 3, 2022

Related U.S. Application Data

(60) Provisional application No. 63/057,347, filed on Jul. 28, 2020.

(51) Int. Cl.
*B62M 9/00*     (2006.01)

(52) U.S. Cl.
CPC ......... *B62M 9/00* (2013.01); *B62M 2009/007* (2013.01)

(58) Field of Classification Search
CPC .. B62M 2009/007; B62M 9/136; B62J 13/00; F16H 7/18; B62K 19/44
USPC ................................. 474/144, 140
See application file for complete search history.

(56) References Cited

U.S. PATENT DOCUMENTS

| | | | | |
|---|---|---|---|---|
| 582,096 A * | 5/1897 | Rominger | ................ | B62J 13/02 474/144 |
| 599,005 A * | 2/1898 | Minturn | ................ | B62J 13/00 474/147 |
| 655,316 A * | 8/1900 | Welch | ................ | B62J 15/00 474/144 |
| 4,573,950 A * | 3/1986 | Nagano | ................ | B62M 9/136 474/144 |
| 4,832,667 A * | 5/1989 | Wren | ................ | B62M 9/135 474/140 |
| 5,002,520 A * | 3/1991 | Greenlaw | ................ | B62J 13/00 474/140 |
| 5,460,576 A * | 10/1995 | Barnett | ................ | B62M 9/136 474/140 |
| 5,725,450 A * | 3/1998 | Huskey | ................ | B62M 9/16 474/134 |

(Continued)

OTHER PUBLICATIONS

Chain Guide—ISCG05, [online], Retrieved from https://www.oneupcomponents.com/, OneUp Components, United States of America.

(Continued)

*Primary Examiner* — Henry Y Liu
(74) *Attorney, Agent, or Firm* — Jason H. Foster; Kremblas & Foster

(57) ABSTRACT

An assembly for minimizing the disengagement of a chain from a chain ring is disclosed. The assembly includes a bracket and a chain guide assembly. The chain guide assembly includes an inboard leg, an outboard leg, and a lock. The lock may be configured to allow a rider to remove the outboard leg of the chain guide assembly without tools.

20 Claims, 12 Drawing Sheets

(56) References Cited

U.S. PATENT DOCUMENTS

| | | | | |
|---|---|---|---|---|
| 6,165,092 | A * | 12/2000 | Bramham | B62M 9/16 474/134 |
| 6,354,973 | B1 * | 3/2002 | Barnett | B62J 13/00 474/140 |
| 6,533,690 | B2 * | 3/2003 | Barnett | B62M 9/138 474/140 |
| 7,059,983 | B2 | 6/2006 | Heim | |
| 8,235,849 | B2 * | 8/2012 | Cranston | B62J 13/00 280/727 |
| RE44,379 | E * | 7/2013 | Rogers | B62J 23/00 474/144 |
| 8,491,429 | B2 | 7/2013 | Cranston et al. | |
| 8,534,693 | B2 | 9/2013 | Sloan et al. | |
| 8,961,342 | B2 * | 2/2015 | Emura | B62M 9/136 474/140 |
| 8,968,129 | B2 * | 3/2015 | Emura | B62M 9/16 474/140 |
| 8,991,846 | B2 * | 3/2015 | Twers | B62M 9/126 280/283 |
| RE45,508 | E | 5/2015 | Rogers | |
| 9,249,867 | B2 * | 2/2016 | Graziosi | F16H 7/18 |
| 9,327,786 | B2 * | 5/2016 | Cranston | B62J 13/00 |
| 9,896,157 | B2 * | 2/2018 | Emura | B62M 9/135 |
| 10,053,188 | B2 | 8/2018 | Staples | |
| 10,464,635 | B2 * | 11/2019 | Pfeiffer | B62J 13/00 |
| 2002/0160869 | A1 * | 10/2002 | Barnett | B62M 9/138 474/144 |
| 2003/0060316 | A1 * | 3/2003 | Jiang | B62M 9/16 74/134 |
| 2004/0009835 | A1 * | 1/2004 | Heim | B62M 9/138 474/199 |
| 2005/0159260 | A1 * | 7/2005 | Gogo | B62J 13/00 474/140 |
| 2006/0199690 | A1 | 9/2006 | Gardner et al. | |
| 2007/0265121 | A1 * | 11/2007 | Gross | B62J 13/00 474/144 |
| 2009/0062049 | A1 * | 3/2009 | Cranston | B62J 13/00 474/144 |
| 2009/0220319 | A1 * | 9/2009 | Weagle | B62M 9/126 411/103 |
| 2012/0142469 | A1 * | 6/2012 | Barefoot | B62M 9/00 474/139 |
| 2012/0248730 | A1 * | 10/2012 | Sloan | B62M 9/16 280/210 |
| 2013/0053195 | A1 * | 2/2013 | Emura | B62M 9/16 474/140 |
| 2013/0053196 | A1 * | 2/2013 | Emura | B62M 9/136 474/140 |
| 2013/0217527 | A1 * | 8/2013 | Graziosi | B62M 9/16 474/140 |
| 2016/0265633 | A1 * | 9/2016 | Miles | B62M 9/136 |
| 2017/0045121 | A1 * | 2/2017 | Staples | B62M 9/121 |
| 2018/0022418 | A1 * | 1/2018 | Pfeiffer | F16H 7/18 474/140 |
| 2018/0319459 | A1 | 11/2018 | Staples | |
| 2019/0127023 | A1 * | 5/2019 | Fujimoto | B62M 9/126 |

OTHER PUBLICATIONS

Chain Keeper, [online], Retrieved from https://www.paulcomp.com/, [2019], Paul Component Engineering, United States of America.

FSA Grid Chain Guide, [online], Retrieved from https://www.fullspeedahead.com/, [2019], Apr. 7, 2017, Full Speed Ahead, United States of America.

Cheap Chain Keeper, [online], Retrieved from https://getfireshot.com/, [2018], Bike Forums, MH Sub I, LLC dba Internet Brands, 2010, United States of America.

Bikeblogger, Paul Chain Keeper Catcher Guide Installation, [online], Retrieved from https://www.youtube.com/, Oct. 3, 2015, United States of America.

Weagle NPL_20131017 9, photo.

Weagle NPL_20131017 10, photo.

Weagle NPL_20131017 16, magazine, p. 138.

Weagle NPL_20131017 19, Chainguide, Race Face Performance Products, 2005.

Weagle NPL_20131017 21, Universal Chainguide System, brochure, Mountain Cycle Simply the Best, United States of America.

Weagle NPL_20131017 22, Universal Chainguide System, brochure, Mountain Cycle Simply the Best, United States of America.

Weagle NPL_20131017 23, Universal Chainguide System, brochure, Figures 1-8, Mountain Cycle Simply the Best, United States of America.

* cited by examiner

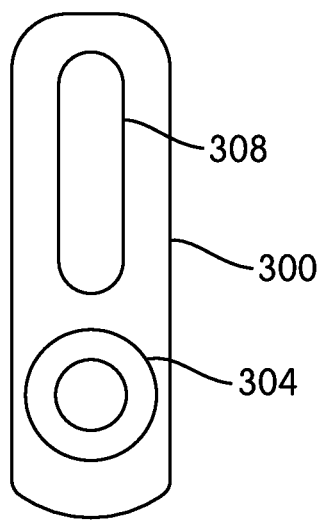 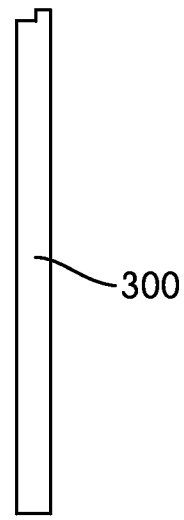
FIG. 19　　　　　　　FIG. 20
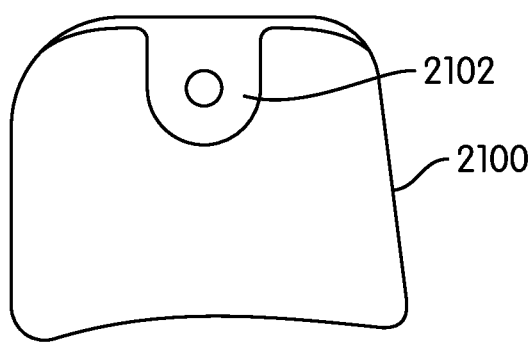 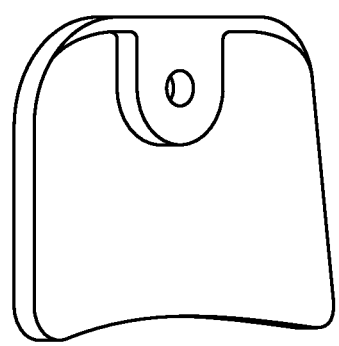
FIG. 21　　　　　　　FIG. 22

TWO-PIECE UPPER CHAIN GUIDE

BACKGROUND OF THE INVENTION

The present disclosure relates to a chain guide for a bicycle. More specifically, the present design relates to a chain guide for use adjacent a front gear of a bicycle, where the inboard and outboard legs can slidably engage and disengage from one another.

Bicycles come in many different shapes and sizes. Riders change their bicycles in a variety of ways so that the bicycles perform in the manner a rider desires. In some cases, the rider may select a particular frame size that fits them in a particular manner. They may select a particular handlebar or tire style, depending on whether they are doing road racing or off-road riding. They may select a particular suspension style, depending on the number and type of obstacles they may encounter.

In addition to these considerations, riders may wish to vary the chain rings that they use with their bicycles to better tune the torque they will require to properly ride in a particular location. A rider may want to select from a variety of chain rings and change them depending on what type of riding they plan to do. However, when a chain ring size is changed, that change may affect other features of the bicycle. In addition, a rider may want to minimize expense by using the same accessory equipment on different bicycles, including bicycles with different overall styles.

In some riding situations, it may be desirable to use a chain guide to minimize the risk of the chain becoming detached from the chain ring. It is conventional to use a chain guide in the area where the bicycle chain comes into contact with a front chain ring or chain ring set and also in the area where the bicycle chain moves away from contact with the front ring or ring set. It is also conventional to secure the chain guide or guides to a bracket or plate that is attached to the bicycle frame adjacent the front chain ring. An example of such devices may be found in U.S. Pat. No. 8,235,849.

However, it is common for a rider to change the chain rings used on a particular bicycle and to use different bicycle frames for riding. Different chain rings incorporated on different bicycle frames will cause the chain to enter and leave the front chain ring set at a variety of angles. The chain guide may be helpful in guiding the chain into proper engagement with the front chain ring and to exit the chain ring at an appropriate angle before returning to the rear chain ring set.

In some circumstances, a chain may become disengaged from the remainder of the drive train, such as the chain rings, while riding. This may occur for a variety of reasons, including contact with obstacles, the lodging of a small rock or mud in a series of chain cavities, rider foot misplacement, or several other reasons. In addition, other debris may become lodged in a chain ring and cause the riding to be negatively affected. When all the chain guides attached near a chain ring are fixed in place, it may be difficult for a rider to easily remove and/or reinstall the chain onto the chain rings and be on his or her way. If such a circumstance were to occur when the rider is near his or her vehicle or home, the rider could easily use tools to remove some of the chain guides, do any necessary cleaning or adjustments, replace the chain, and then use the tools to reinstall the chain guides. However, because these circumstances often occur when a rider is remote from such locations, tools to make these removals and adjustments are not readily available.

Accordingly, in many embodiments, it may be desirable to incorporate a structure into the chain guide assembly that allows the rider to remove some or all of the chain guide assembly without requiring the use of a tool. It may be desirable in some embodiments for a rider to be able to leave one portion of the guide assembly locked in place on the bicycle, so that the position and orientation of the chain guide assembly need not be adjusted after the rider makes the necessary cleaning, adjustments, or re-installation of the chain.

BRIEF SUMMARY OF THE INVENTION

The present invention is directed to an assembly for minimizing the disengagement of a chain from a chain ring.

In one embodiment, the assembly may include a bracket and a chain guide assembly. The bracket may be configured to be attached to a bicycle frame adjacent a chain ring. The bracket may define a first slot.

The chain guide assembly may be releasably mounted to the bracket and may include an inboard leg, an outboard leg, a first mating portion, a second mating portion, and a lock. The first mating portion may be on the inboard leg. The second mating portion may be on the outboard leg. The first mating portion and the second mating portion may interfit with one another to connect the inboard leg to the outboard leg. The lock may have a first position and a second position. In the first position, the lock may be capable of positioning the inboard leg and the outboard leg relative to one another. In the second position, the lock may release the inboard leg and the outboard leg from one another.

The first mating portion may comprise a projection. The second mating portion may comprise a channel. The projection may be shaped to slide within the channel. The lock may comprise a finger on the outboard leg. The lock may comprise a finger on the inboard leg. The lock may comprise at least one magnet. The lock may comprise a magnetically attracted material.

The channel may be oriented substantially horizontally. The channel may be oriented substantially vertically. The channel may have a closed end.

The first mating portion may include a first projection and the second mating portion may include a first channel. The first projection and the first channel may be configured to interfit and slide relative to one another. The first mating portion may include a second projection and the second mating portion may include a second channel. The second projection and the second channel may be configured to interfit and slide relative to one another.

The first projection and the second projection may be integrally formed. The second projection may include at least one lip extending away from the first projection.

The interfitting of the second projection and the second mating portion may substantially restrict movement of the inboard leg and the outboard leg relative to one another in at least one direction. The interfitting of the second projection and the second mating portion may substantially restrict movement of the inboard leg and the outboard leg in at least two directions.

The interfitting of the second projection and the second mating portion may substantially restrict movement of the inboard leg and the outboard leg relative to one another in at least one direction when the lock is in the first position. The interfitting of the second projection and the second mating portion may substantially restrict movement of the inboard leg and the outboard leg relative to one another in at least two directions when the lock is in the first position.

The lock may substantially restrict movement of the inboard leg and the outboard leg relative to one another in a direction different from the at least one direction when the lock is in the first position. The lock may substantially restrict movement of the inboard leg and the outboard leg relative to one another in a direction different from the at least two directions when the lock is in the first position.

BRIEF DESCRIPTION OF THE SEVERAL VIEWS OF THE DRAWINGS

FIG. 19 is a side view of one embodiment of a bracket;

FIG. 20 is a front view of one embodiment of a bracket;

FIG. 21 a side view of another embodiment of an outer leg;

FIG. 22 is a perspective view of the outer leg of FIG. 21;

Figure 1:
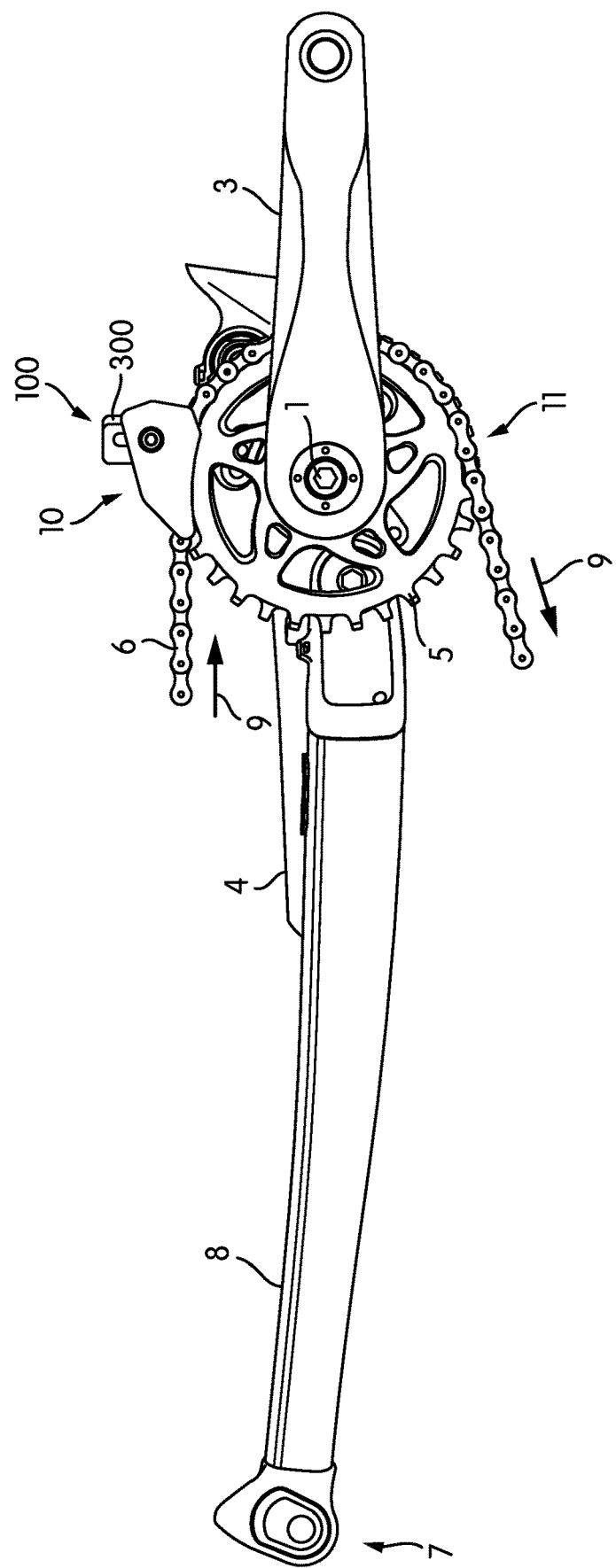
FIG. 1 is a side view of the assembly according to the disclosure, showing the relevant position of the assembly on a bicycle frame.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

In this detailed description, various terms relating to direction may be used. The elements discussed herein relate to a bicycle. Because, in its operable position, a bicycle is oriented generally vertically, i.e., perpendicular to the ground, the direction terms refer to the position of an element relative to gravity when the bicycle is in its operable position. Accordingly, for example, the term "downwardly" refers to the direction towards the ground when the bicycle is in its operable position, and the term "forwardly" relates to a direction towards a front wheel of the bicycle when it is in its operable position. Further, the terms "inboard" and "outboard" may be used. The term "inboard" describes a position between one item and a vertical plane substantially bisecting the bicycle. The term "outboard" describes a position of an object further from the vertical center plane of the bicycle. In addition, the terms "bicycle" and "bike" are used herein interchangeably. A person having ordinary skill in the art will understand that if something is referred to as one, it can refer to the other.

The present device relates to an assembly for minimizing the risk of disengagement of a chain from a chain ring. The illustrations herein only partially show the bicycle structure. However, an ordinary designer will fully understand how the structures described herein may be incorporated into a bicycle.

Figure 2:
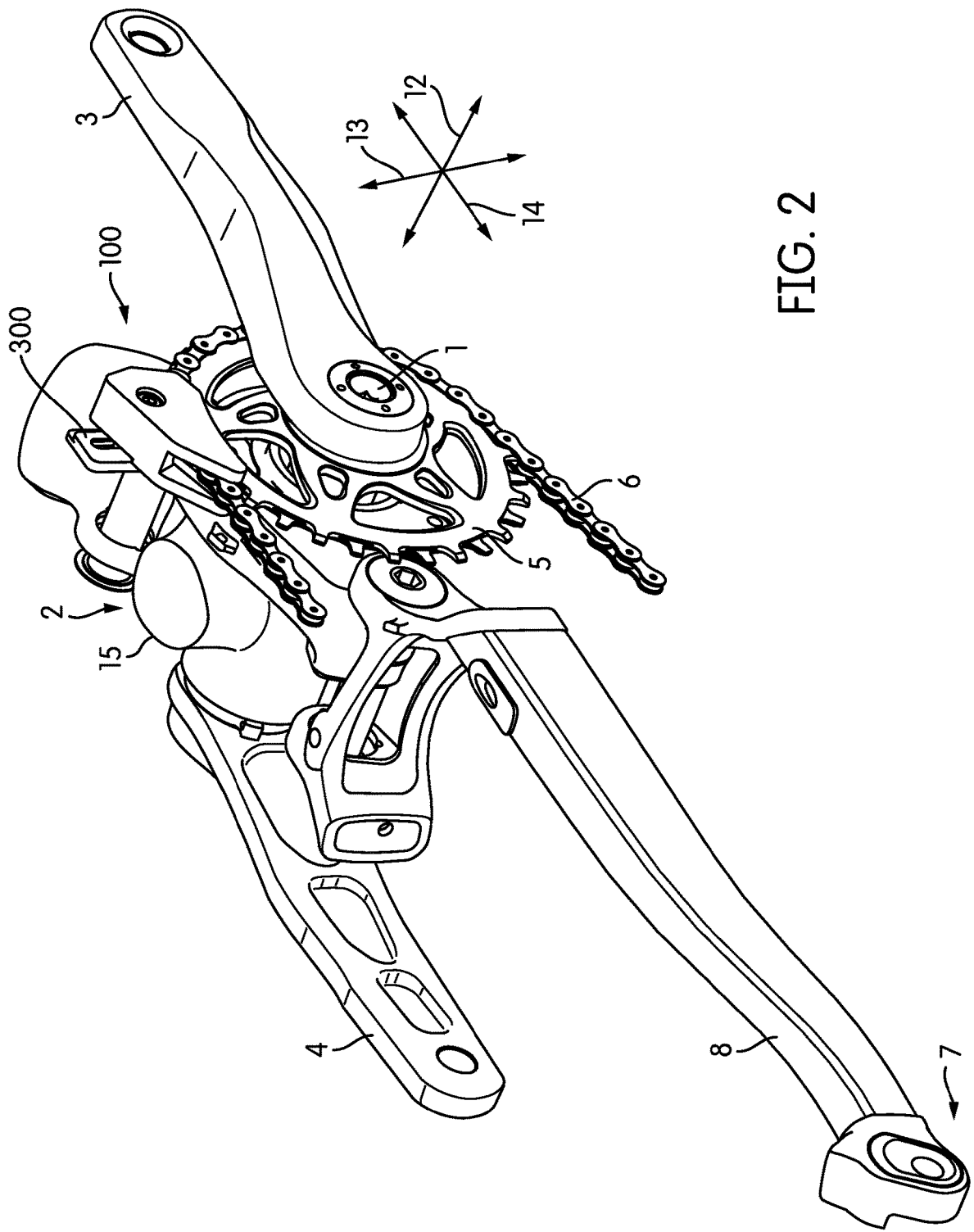
FIG. 2 is a perspective view of the assembly as shown in FIG. 1.
Figure 4:
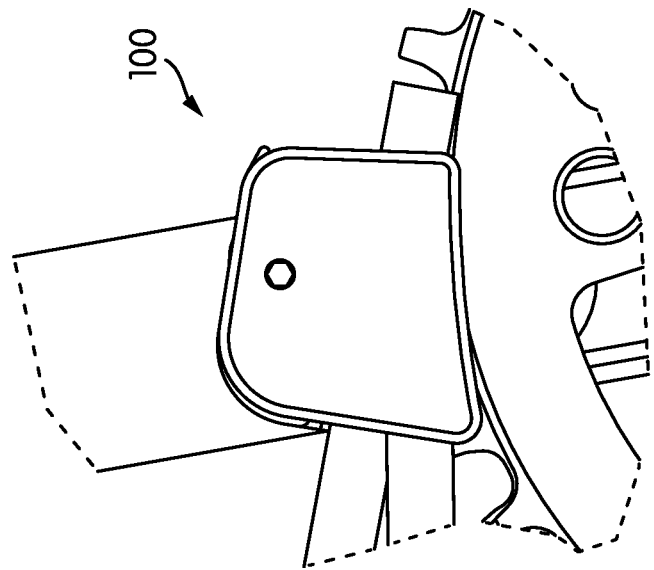
FIG. 4 is a closer side view of the assembly of FIG. 3.
Figure 3:
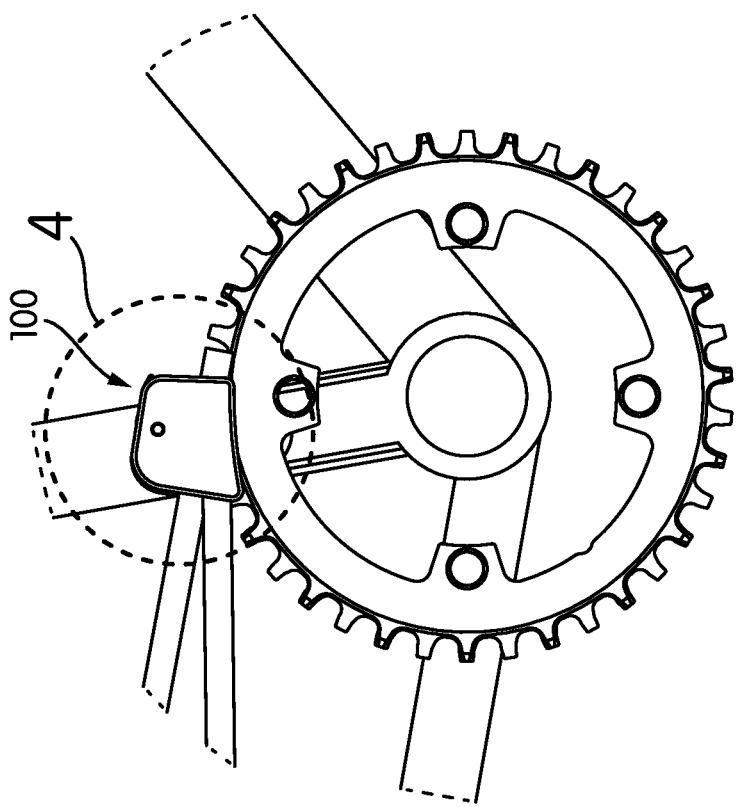
FIG. 3 is a side view of a first embodiment of the assembly without some of the drive train.
Figure 6:
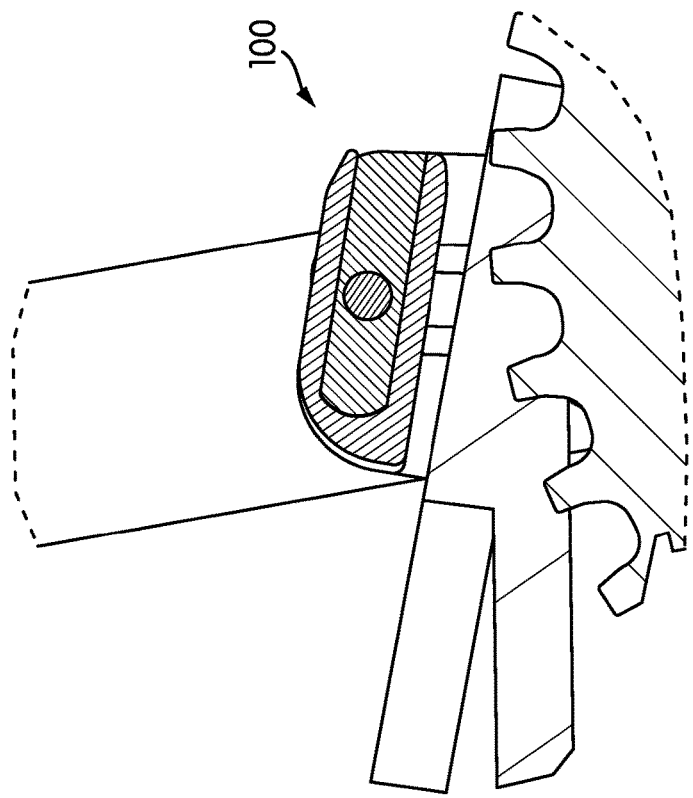
FIG. 6 is a cross-sectional view of the assembly of FIG. 5 taken along line 6-6 of FIG. 5.
Figure 5:
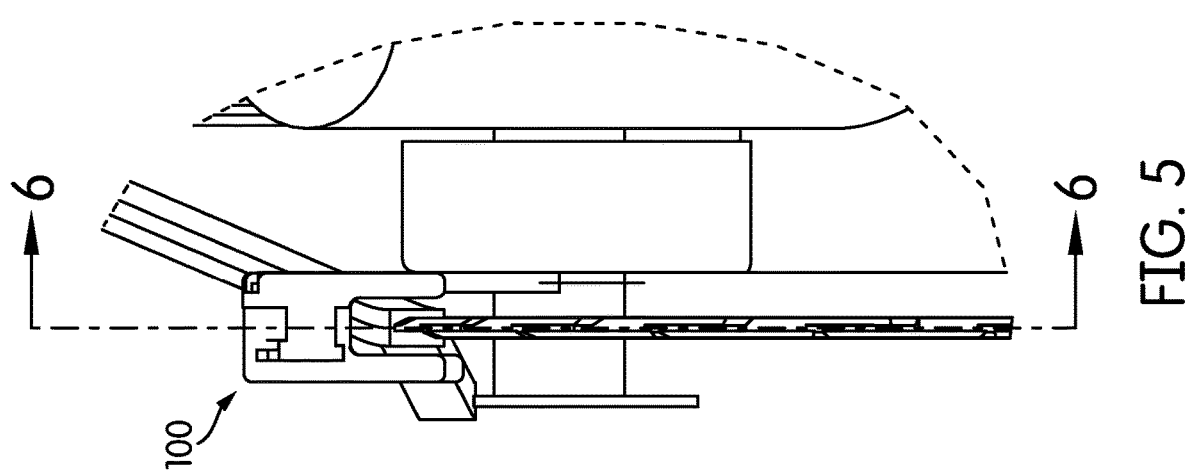
FIG. 5 is a front view of the assembly of FIG. 3.

Turning to FIGS. 1 and 2, when a rider rides a bicycle, the rider presses their feet in a rotational manner on pedals (not shown) attached to a crank shaft 1. The crank shaft extends through a bottom bracket 2 of a bicycle frame 15 and maintains the pedals, and the arms 3, 4 attached between the pedals and the crank shaft 1, in an opposite orientation, where they are about 180 degrees apart, as shown. One or more chain rings 5 may be mounted on or adjacent the crank shaft 1 and may be attached in a manner such that rotation of the crank shaft 1, through movement of the arms 3, 4, may also rotate the chain ring 5. A chain 6 may engage the chain ring 5 and may also engage additional, rear chain rings or the cassette (not shown), which are conventionally mounted at a location at the rear end 7 of an arm 8. When the rider uses the pedals and thereby rotates the chain ring 5, the chain 6 may move into and out of engagement with the chain ring 5 and a gear on the cassette.

When the bicycle is in use, in typical circumstances, the rider will move the pedals and arms 3, 4 in a clockwise (in the orientation of FIG. 1) direction, and the chain 6 moves in the direction of the arrows 9, although many bicycles allow a rider to pedal in an opposite, counterclockwise direction. In most conventional bicycles for adults, a conventional ratchet system (not shown) may be incorporated into the bicycle to disengage the drive force of the drive chain 6 from the rear shaft and wheel (not shown) whenever the pedals are moved in a direction other than clockwise, for example, when coasting.

A rider may use a variety of different bicycles and may install a variety of sizes of chain rings 5 in the location shown and in the cassette at the rear location 7. Indeed, riders may select a single front ring 5 or a series of front rings 5 installed adjacent one another in a conventional manner and may select between any number of gears that are installed in the cassette in the rear area 7. Many riders may select two front gears and five rear gears (a "ten speed"), three front gears and seven rear gears (a "twenty-one speed"), or another combination. The choice of the number and size of each ring can be individually selected by the rider to support the type of riding the rider wishes to do and the amount of torque the rider is interested in using to ride. Because of this variability in the number and size of rings and the size of different types of bicycle frames 15, there is variation in the lateral and vertical angle at which the chain 6 may engage the chain ring 5 in the engagement area 10 and in the lateral and vertical angle at which the chain 6 may exit the chain ring 5 in the disengagement area 11. Looking at FIGS. 3-6, simple straight lines have been used tangential to the arc of the chainring to represent the potential spatial envelope occupied by the chain. These lines show two different positions of the chain corresponding to its engagement with different rear wheel cogs (not shown) of the bicycle.

Among the risks in riding a bicycle is the risk of the chain 6 becoming disengaged from the drive system (chain ring 5 and rear cassette). While it is inconvenient when a chain falls off when a rider is riding on a neighborhood path near their house, it can be dangerous when a rider is riding in an untraveled area on a mountain or wilderness area. While a rider may deliberately select drive gears so that the risk of chain disengagement due to the relative angles of the chain is reduced, not all variables can be controlled. Sticks and rocks and other items in the environment may contact the chain while the rider is riding and also affect the angle of the chain. Accordingly, many riders may choose to incorporate a guide to help position the chain 6 as it enters the engagement area 10 or leaves the disengagement area 11 to minimize the risk of disengagement.

In the present illustration, the assembly 100 to be described and claimed in further detail herein is shown as being generally in the engagement area 10 of the front chain ring 5. In other embodiments, a functional equivalent of the assembly could be positioned in the disengagement area 11 of the front chain ring 5. In other embodiments, the assembly could be positioned in the engagement or disengagement areas of the rear cassette. A typical designer will be able to adjust the precise configuration of the assembly 100 to work in one of the other locations. As noted above, the chain 6 can be moved in the opposite direction from the direction 9, and accordingly, the disengagement area 11 can become an engagement area 10 when the arms 3, 4 are rotated counterclockwise.

The present disclosure may refer to a variety of orientations. These orientations are best understood with respect to other structures on the bicycle. Returning to FIG. 2, the "lateral" orientation 12 is a direction that is generally parallel to the axis of the crank shaft 1. The "vertical" orientation 13 is a direction that is generally perpendicular to the lateral orientation 12 and generally perpendicular to the ground when a bicycle is in use. The "fore-aft" or "horizontal" orientation 14 is a direction that is generally perpendicular to the lateral orientation 12 and to the vertical orientation 13 and that generally runs parallel to the overall axis of the bicycle frame 15. The "rotational" orientation is an orientation that rotates along any axis. A bracket 300 may be attached to the bicycle frame 12 using any conventional structure, as will be discussed in greater detail below. Because the bracket 300 can be adjusted into a variety of rotational and angular positions based on the mount, the orientations are referred to generally, rather than as precise orientations. For example, the adjustment of the vertical orientation 13 need not adjust the chain guide along an axis strictly perpendicular to the ground when the bicycle is in a riding position. Instead, the vertical orientation may vary several degrees from vertical. In the present disclosure, therefore, for clarity, the orientations may be referred to a being vertical, lateral, rotational, and fore-aft. A typical designer will be able to easily understand these descriptions of orientations.

A first embodiment of the assembly 100 is shown in FIGS. 3-20. As may be best seen in FIG. 7, the assembly 100 may include a bracket 300 and a chain guide assembly 302. The bracket 300 may be configured to be attached to a bicycle frame 15 using a standard bolt, such as the bolt 704. This attachment structure is one of several that are conventional. The bracket 300 may be assembled to the bicycle frame 15 in any conventional manner, such as high mount, low mount, or using an ISCG system, depending on the configuration of the bracket 300 and the desires of the designer. The bracket 300 shown is relatively simple. If desired, the bracket 300 may be more robust and may be configured to allow the attachment of a bash guard or other accessory that a designer may believe to be appropriate in a particular assembly 100.

The bracket 300 may be configured to be attached to a bicycle frame 15 using the exemplary conventional mounting slot 304. In a conventional manner, a rider may select an appropriate first bolt 704 (which may be provided with the assembly 100 by the manufacturer or may be one the rider prefers) and insert the first bolt 704 through a mounting slot 304 and into a conventional threaded recess on a bicycle frame 15. Rotation of the first bolt 704 may attach the bracket 300 in an appropriate location and rotational placement on a bicycle. Conventionally, the bracket 300 may be attached to the bicycle and then the crank shaft 1, chain ring 5, and arms 3, 4 are attached, such that the bracket 300 is attached between and adjacent the bicycle frame 15 and the chain ring 5, so that the bracket is positioned generally as part of the assembly 100 as shown in FIGS. 1 and 2. The bracket 300 may define a first slot 308 that may be generally a vertical orientation but may vary from vertical for a variety of reasons, such as those discussed above.

Figure 8:
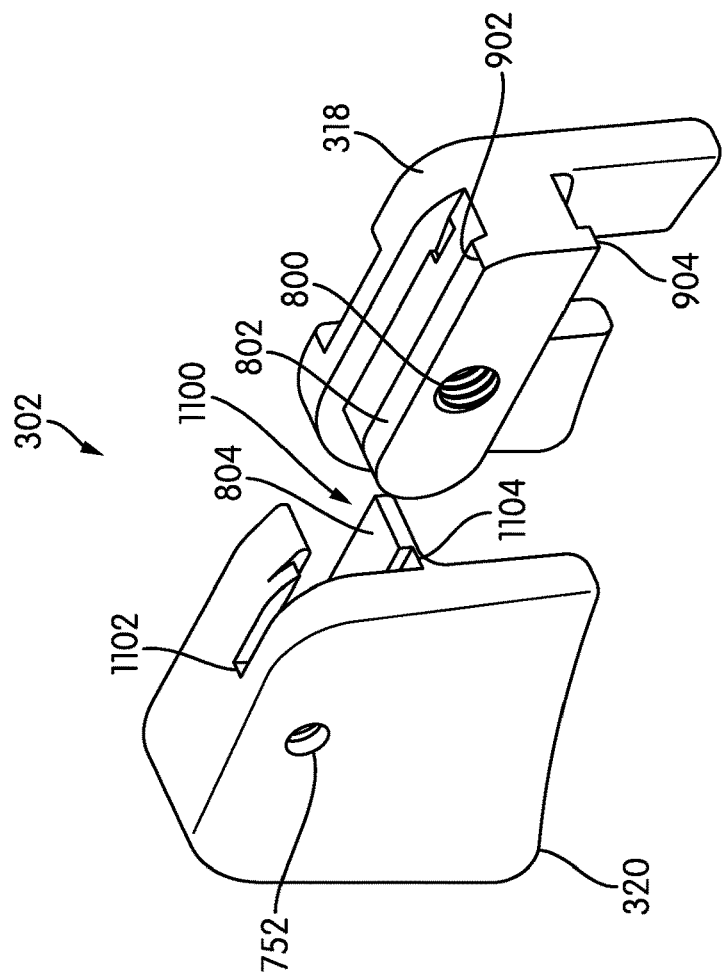
FIG. 8 is an exploded view of the embodiment of the chain guide assembly of FIG. 3.
Figure 7:
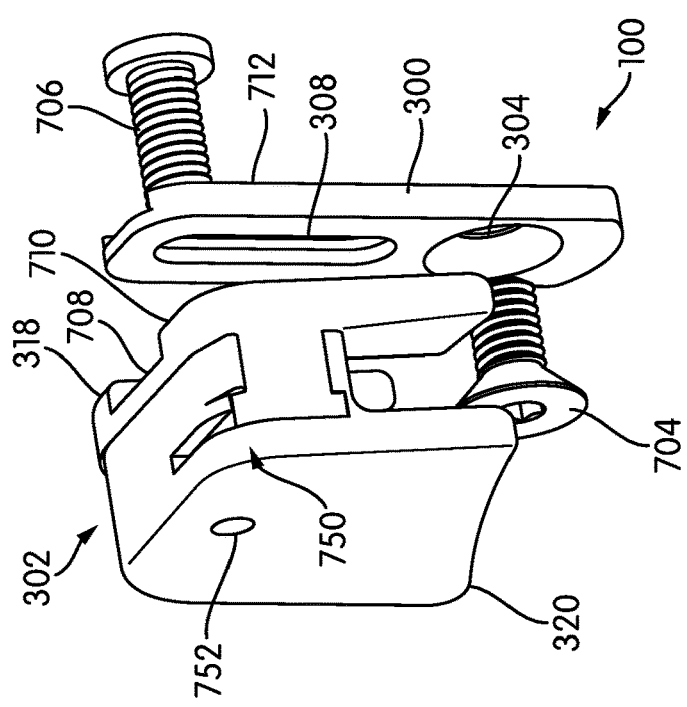
FIG. 7 is an exploded view of the assembly of the embodiment of the bracket of FIG. 19 and the embodiment of the chain guide assembly of FIG. 3.
Figure 11:
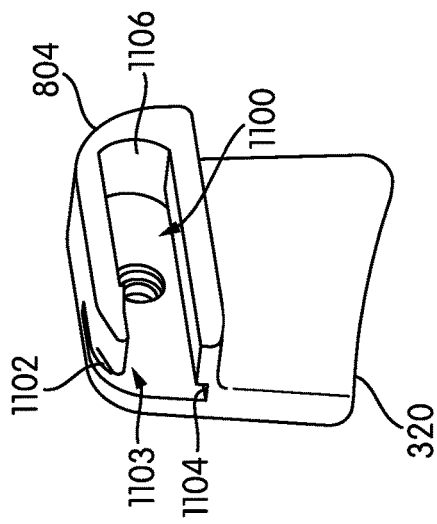
FIG. 11 is a perspective view of one embodiment of an outboard leg of the assembly of FIG. 3.
Figure 12:
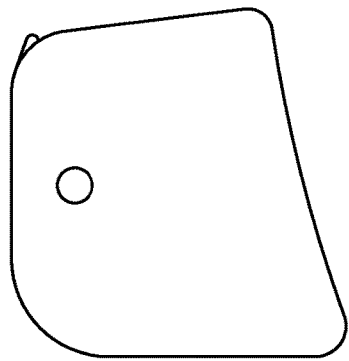
FIG. 12 is a side view of the leg of FIG. 11.
Figure 9:
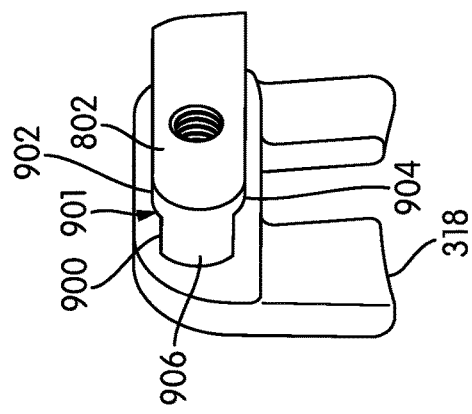
FIG. 9 is a perspective view of one embodiment of an inboard leg of the assembly of FIG. 3.
Figure 10:
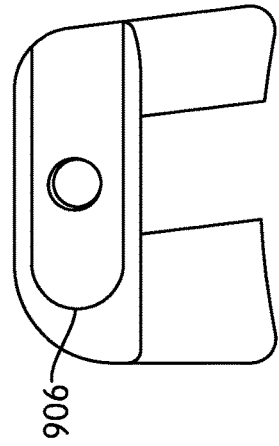
FIG. 10 is a side view of the leg of FIG. 9.
Figure 13:
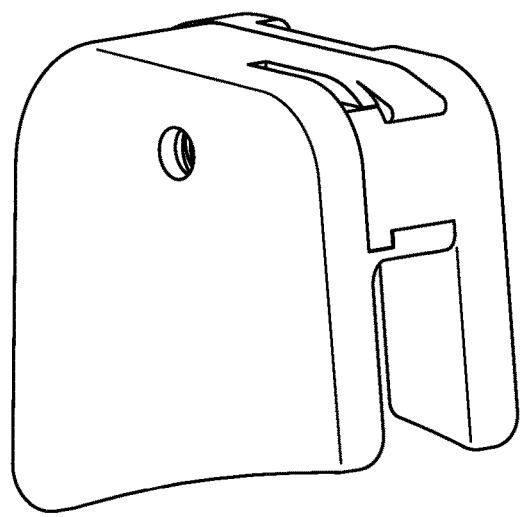
FIG. 13 is a perspective view of the chain guide assembly of FIG. 3.

The structure of the first embodiment shown in FIGS. 3-20 may be most easily understood with reference to FIGS. 7 and 8, which shows the assembly 100, including the bracket 300 and the chain guide assembly 302 in an assembled view and an exploded, unassembled view, respectively. As shown, the chain guide assembly 302 may be removably attached or mounted to the bracket 300. The chain guide assembly 302 may include an inboard leg 318 and an outboard leg 320. The chain guide assembly 302 may be designed, shaped, and configured in a manner that the designer deems appropriate for use with a variety of bicycle frames 15, chain rings 5, and chains 6. The precise materials, shapes, and sizes are a matter of design choice based on the desires of the particular designer. Alternative chain guide profiles and shapes and sizes are possible and contemplated. The shapes, sizes and materials shown and described herein are exemplary.

The chain guide assembly 302 may be removably attached to the bracket 300 using a second bolt 706. The inboard leg 318 of the chain guide assembly 302 may include a recess 800 (best seen in FIG. 8) that may be internally threaded. In many embodiments, the second bolt 706 may be inserted through the slot 308 in the bracket 300 and into the threaded recess 800. The second bolt 706 may be rotated to tighten the connection between the bracket 300 and the inboard leg 318, thereby removably securing or releasably mounting at least a portion of the chain guide assembly 302 to the bracket 300. In some embodiments, it may be desirable to include a relief 708 (best seen in FIG. 18) on one lateral side 710 of the inboard leg 318 to allow the back lateral side 712 of the bracket 300 to be disposed substantially flush with the one lateral side 710 of the inboard leg 318 and to minimize rotation of the chain guide assembly 302 relative to the bracket 300. However, such a configuration is not necessary for the remaining features of the device to function correctly. In some configurations, the outboard end 1602 (see FIG. 16) of the second bolt 706 may include a recess capable of engaging a tool to allow the chain guide assembly 302 to be adjusted relative to the bracket 300 from the outboard side, such as a recess configured to receive a conventional hex wrench. In such a configuration, it may be desirable to include a hole 752 in the outboard leg 320 to allow the user to access the outboard end 1602 of the second bolt 706. After the inboard leg 318 is releasably mounted to the bracket 300, an outboard leg 320 may be releasably mounted to the inboard leg 318, and thereby the chain guide assembly 302 may be releasably mounted to the bracket 300.

Figure 26:
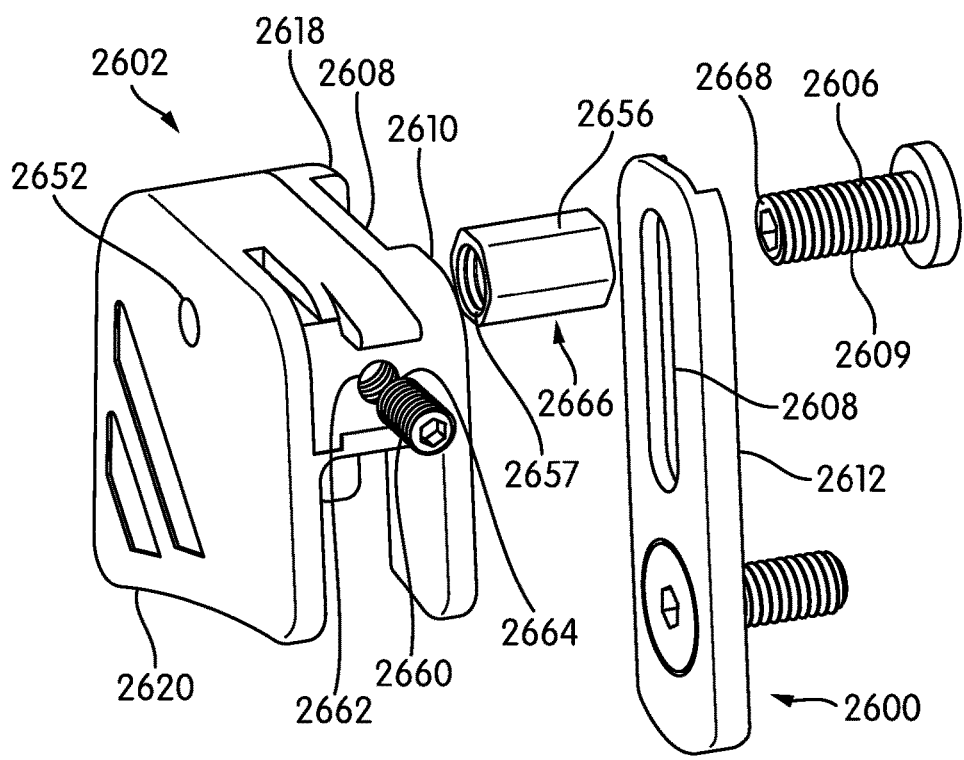
FIG. 26 is a partially exploded view of yet another embodiment of a chain guide assembly.
Figure 27:
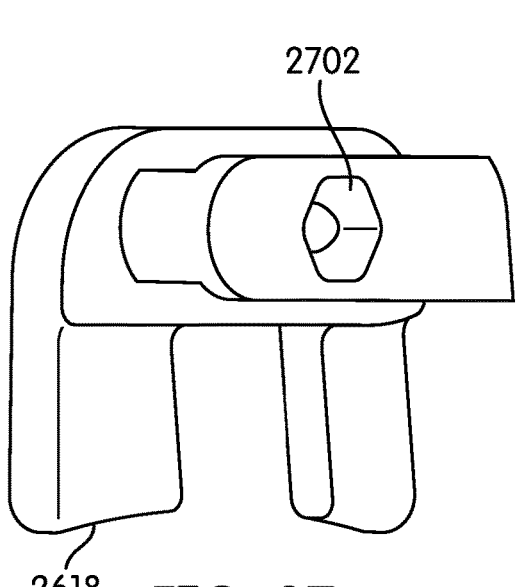
FIG. 27 is a perspective view of an outer leg of the embodiment of FIG. 26.
Figure 28:
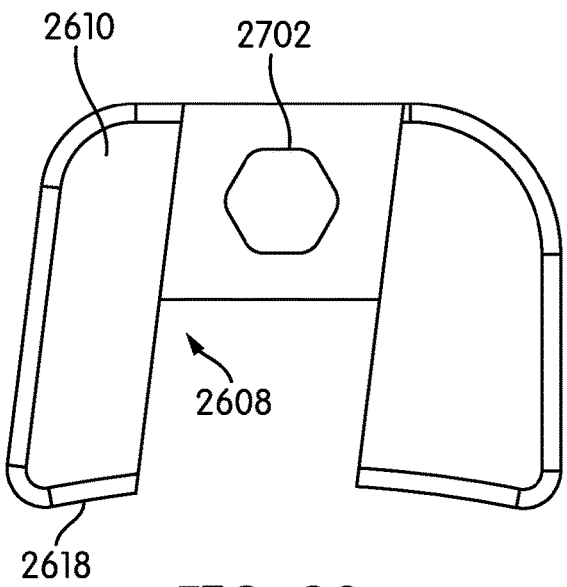
FIG. 28 is a back view of the outer leg of FIG. 27.

In another embodiment, best seen in FIGS. 26-28, a sleeve 2656 may be added. The chain guide assembly 2602 may be removably attached to the bracket 2600 using a series of parts. A second bolt 2606 may be threaded through the slot 2608 in the bracket 2600. The sleeve 2656 may include an internal threaded cavity 2657 that may engage the threads 2609 on the second bolt 2606. The sleeve 2656 may be used like a conventional nut to secure the bolt 2606 at a particular vertical position on the bracket 2600. The inboard leg 2618 of the chain guide assembly 2602 may include a recess 2702 (best seen in FIG. 27) that may be configured to allow the sleeve 2656 to pass through the inboard leg recess 2702. The outboard leg 2620 may similarly include a recess (not shown) that may be shaped and sized to allow the sleeve 2656 to at least partially pass through the outboard leg recess. In many embodiments, the second bolt 2606 may be inserted through the slot 2608 in the bracket 2600 and into the threaded recess 2657 in the sleeve 2656. The bolt 2606 may be rotated to engage the threads 2609 on the bolt 2606 with the threads in the threaded recess 2657 in the sleeve 2656. The inboard leg 2618 may then be placed such that the inboard leg recess 2702 at least partially surrounds the sleeve 2656. When the inboard leg 2618 is at an appropriate lateral position, a threaded set screw 2660 may be used to secure the inboard leg 2618 in an appropriate lateral position. The set screw 2660 may be rotated to engage the threads on the set screw 2660 with a threaded recess 2662 defined in the inboard leg 2618. The set screw 2660 may be rotated until a free end 2664 of the set screw 2660 engages an outer surface 2666 of the sleeve 2656. In this way, the inboard leg 2618 may be positioned relative to the bracket 2600, these structures thereby removably securing or releasably mounting at least a portion of the chain guide assembly 2602 to the bracket 2600. In some embodiments, it may be desirable to include a relief 2608 (best seen in FIG. 28) on one lateral side 2610 of the inboard leg 2618 to allow the back lateral side 2612 of the bracket 2600 to be substantially flush with the one lateral side 2610 of the inboard leg 2618 and to minimize rotation of the chain guide assembly 2602 relative to the bracket 2600. However, such a configuration is not necessary for the remaining features of the device to function correctly. In some configurations, the outboard end 2668 of the second bolt 2606 may include a recess capable of engaging a tool to allow the chain guide assembly 2602 to be adjusted relative to the bracket 2600 from the outboard side, such as a recess configured to receive a conventional hex wrench. In such a configuration, it may be desirable to include a hole 2652 in the outboard leg 2620 to allow the user to access the outboard end 2668 of the bolt 2606. After the inboard leg 2618 is releasably mounted to the bracket 2600, an outboard leg 2620 may be releasably mounted to the inboard leg 2618, and thereby the chain guide assembly 2602 may be releasably mounted to the bracket 2600.

The inboard leg 318 and the outboard leg 320 may be configured to have mating portions that position the inboard leg 318 and the outboard leg 320 relative to one another. The inboard leg 318 may include a first mating portion 802 and the outboard leg may have a second mating portion 804. The shapes of the mating portions 802, 804 may be best seen in FIGS. 9 and 11. As may be best seen in FIG. 9, the first mating portion 802 may include a first projection 900 that extends away from the inboard leg 318. The first mating portion 802 may also include a second projection 901 in the form of an upward facing lip 902 and a downward facing lip 904 extending away from the first projection 900. As may best be seen in FIG. 11, the second mating portion 804 may define a first channel 1100, which may be a substantially horizontal channel. The second mating portion 804 may also include a second channel 1103, which may include an upward facing groove 1102 and a downward facing groove 1104. As may be best seen in FIG. 8, the second projection lips 902, 904 may mate with the respective grooves 1102, 1104 of the second channel 1103 and allow the inboard leg 318 and the outboard leg 320 to slidingly interfit with one another until the end face 906 of the first mating portion 802 contacts the closed end face 1106 of the second mating portion 804. This interfitting of the first mating portion 802 and the second mating portion 804 causes the inboard leg 318 to be removably connected to the outboard leg 320.

In many embodiments, the inboard leg 318 may be integrally formed with the first mating portion 802. The first mating portion 802 may include an integrally formed first projection 900 and second projection 901.

In many embodiments, the outboard leg may be integrally formed with the second mating portion 804. The second mating portion 804 may include an integrally formed first channel 1100 and second channel 1103.

In many embodiments, the interfitting of the second projection 901 and the second channel 1103 may restrict the movement of the inboard leg 318 and the outboard leg 320 relative to one another in at least one direction. In many embodiments, this interfitting may restrict movement of the inboard leg 318 and the outboard leg 320 in a lateral direction 12. In many embodiments, this interfitting may restrict movement of the inboard leg 318 and the outboard leg 320 in at least two directions, such as the lateral direction 12 and the vertical direction 13.

Figure 14:
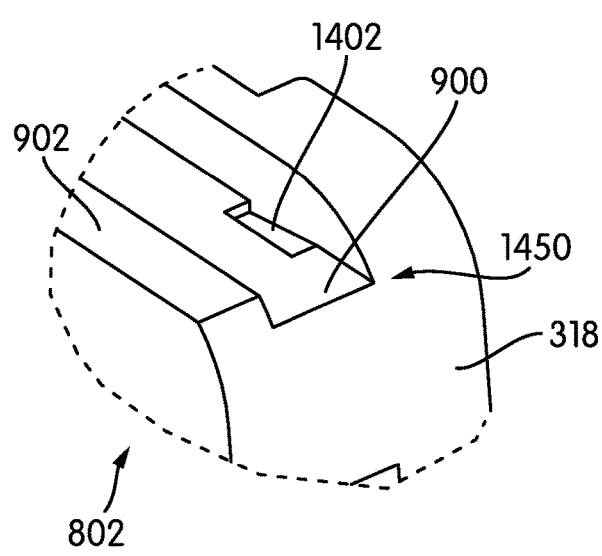
FIG. 14 is a partial view of one portion of a lock on an inboard leg.
Figure 15:
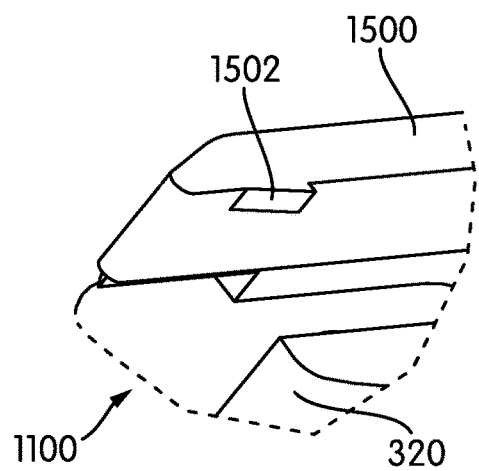
FIG. 15 is partial view of another portion of a lock on an outboard leg.
Figure 16:
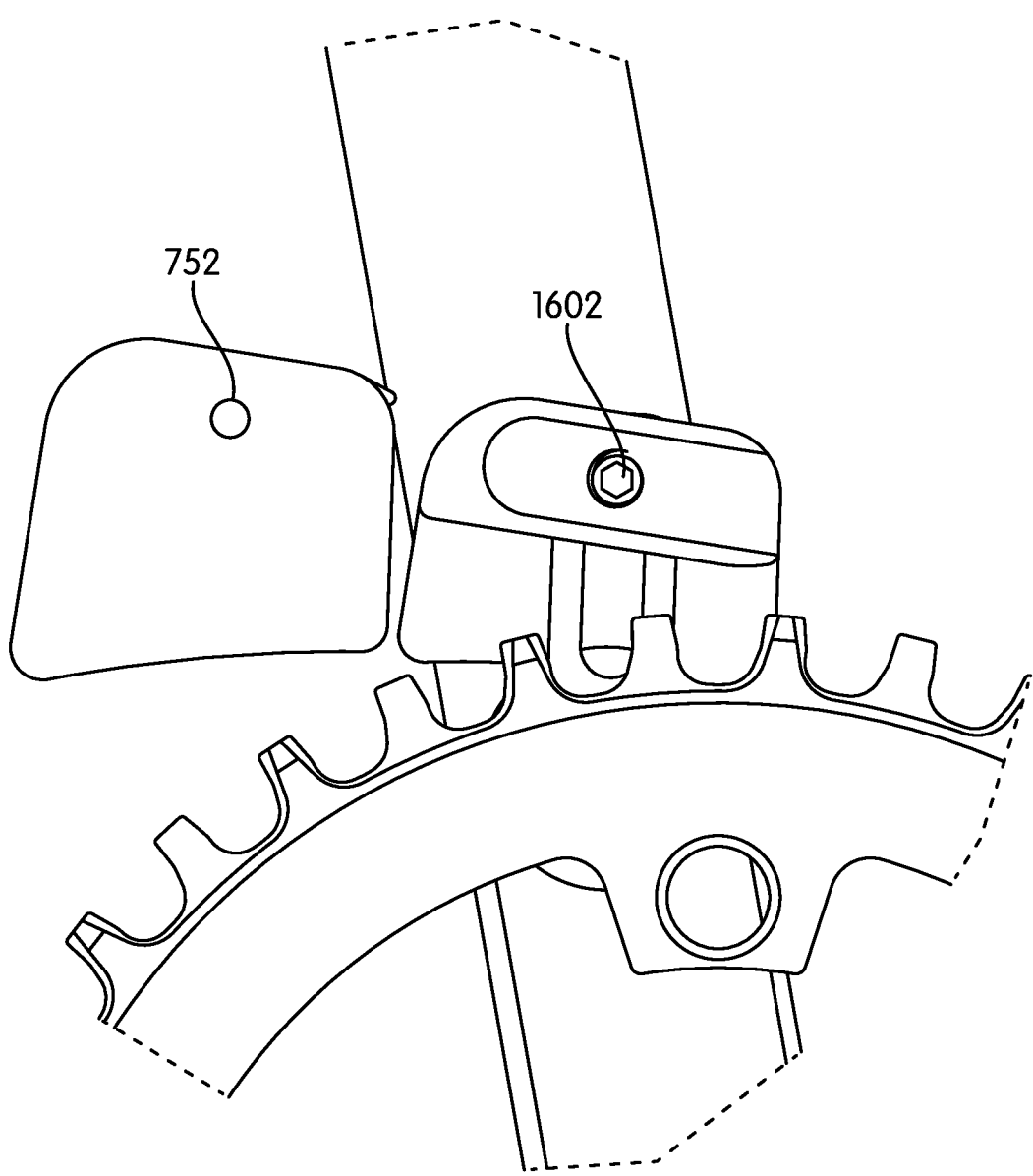
FIG. 16 is a side view similar to FIG. 3, but showing the outboard leg separated from the inboard leg.
Figure 17:
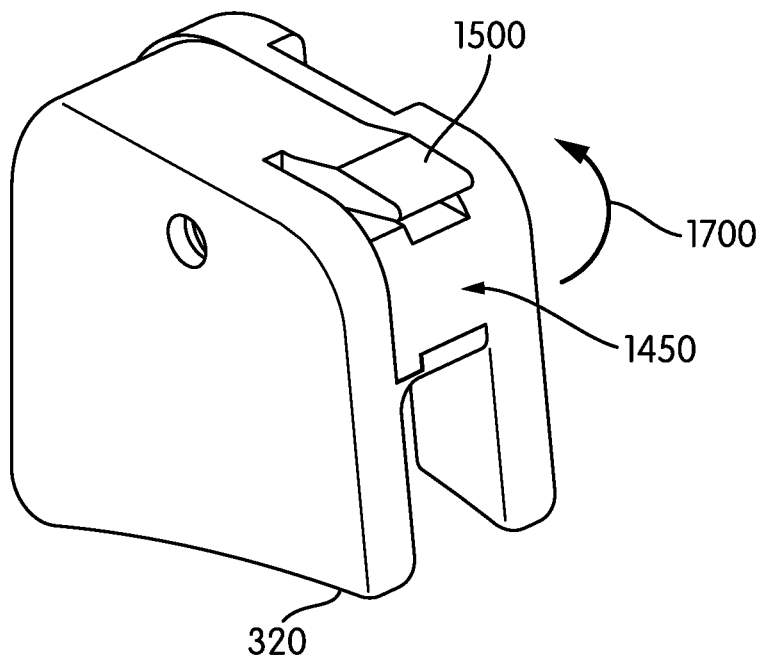
FIG. 17 is a perspective view of the chain guide assembly with the first lock released.
Figure 18:
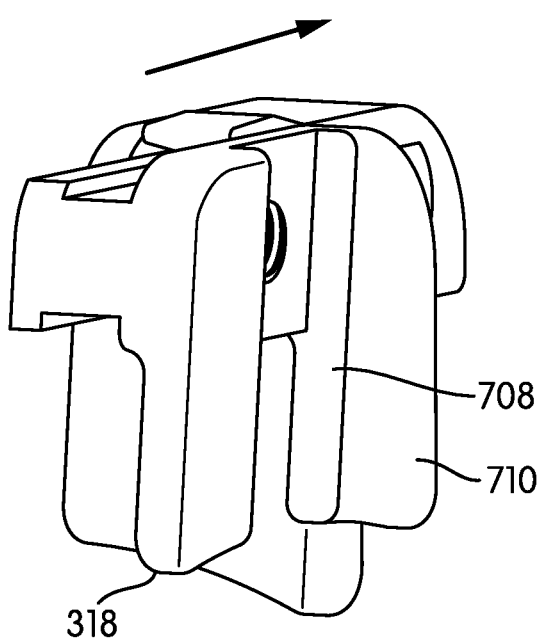
FIG. 18 is a perspective view of the chain guide assembly partially disassembled.

In some embodiments, the inboard leg 318 and the outboard leg 320 may be positioned relative to one another using a lock 750 (see FIG. 7). The details of the lock 750 are best seen in FIGS. 14-18. FIG. 14 illustrates a close view of a first lock portion 1450 on the inboard leg 318. A recess 1402 may be defined within the first projection 900. FIG. 15 illustrates a close view of a second lock portion 1550 on the outboard leg 320. One arm 1500 partially defining the first channel 1100 may include a finger 1502 which may project away from the first channel 1100. When the outboard leg 320 first channel 1100 is placed in mating relationship to the inboard leg 318 first projection 900, the first channel 1100 and the first projection 900 may slidingly engage until the end 906 of the first projection 900 meets the end 1106 of the first channel 1100. At substantially the same time, the finger 1502 may engage the recess 1402. When the finger 1502 engages the recess 1402, these interlocking pieces may be in a first position capable of positioning or locking the inboard leg 318 relative to the outboard leg 320 and releasably holding or locking them in that relative position. When a user wishes to remove the outboard leg 320, the user may lift or rotate the one arm 1500 as shown by the arrow 1700 in FIG. 17. This movement will move the lock 750 into a second position, which may release the inboard leg 318 and the outboard leg 320 from one another.

In many embodiments, the use of a lock 750 may restrict movement of the inboard leg 318 relative to the outboard leg 320 in a direction different from the first direction and the second direction of movement restricted by engagement of the second projection 901 and the second channel 1103. In this embodiment, when the finger 1502 engages the recess 1402 in a first position, the lock 750 may substantially restrict relative movement of the inboard leg 318 and the outboard leg 320 in a third direction different from the first and second directions, such as by restricting movement in a substantially horizontal direction, which is different from the lateral and vertical directions.

Figure 23:
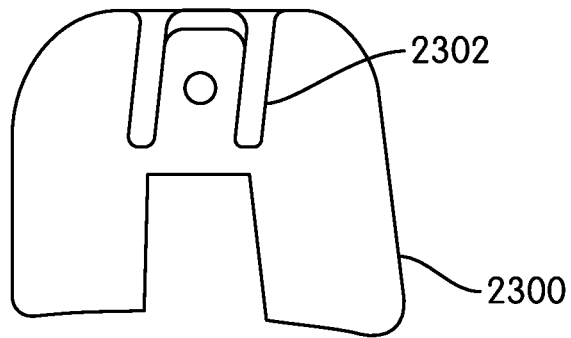
FIG. 23 is a perspective view of another embodiment of an inner leg.

An alternative embodiment is shown in FIGS. 21-23. In the embodiment of FIGS. 21-23, the projection 2102 is shown as being on the outboard leg 2100 and the channel 2302 is shown as being on the inboard leg 2300. In addition, in this embodiment, the channel 2302 and the projection 2102 are shown as being generally vertical, rather than generally horizontal. A further modification (not shown) may allow the channel to open upwardly instead of downwardly. These modifications may be made individually rather than together. A designer may select an appropriate orientation depending on the precise shape of the legs, the desired strength, and an appropriate ease of operation.

Figure 24:
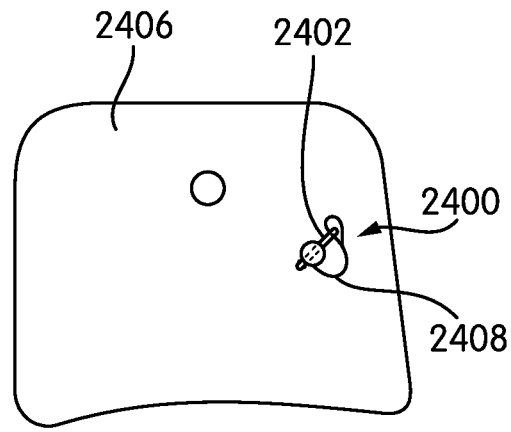
FIG. 24 is a front view of another embodiment of a chain guide assembly.
Figure 25:
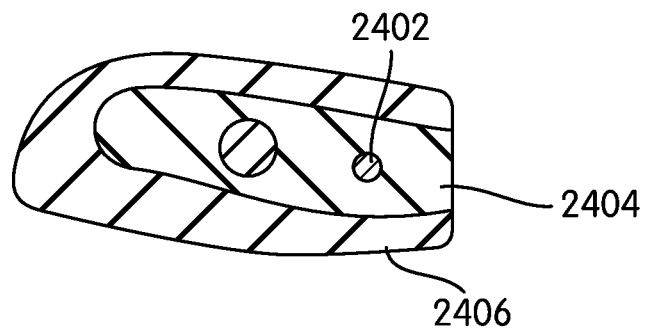
FIG. 25 is a cross-sectional view of the embodiment of FIG. 24.

Another alternative embodiment is shown in FIGS. 24-25. In the embodiment of FIGS. 24-25, the lock 2400 may include a pin 2402 that may pass through both the inboard leg 2404 and the outboard leg 2406. The outer end of the pin 2402 may define a hole. An anchored pin 2408 or a similar device may be placed through the hole to lock the inboard leg 2404 and the outboard leg 2406 together.

In another embodiment, the first mating portion and the second mating portion may be configured to include at least one magnet to thereby magnetically attract one another. For example, the sides of the channel may be lined with a magnetic material and the sides of the projection may be covered in a metal sheet. Bringing the magnetic material into contact or proximity with the metal may be adequate to act as a lock. In such a configuration, it may be desirable to select the material so that the outboard leg does not detach from the inboard leg, but so that a user can overcome the magnetic attraction without needing additional tools.

In the disclosed embodiments, structures and apertures of various sizes and shapes were illustrated. The precise configurations of these items are shown in an illustrative fashion only. A designer can easily change the shape, size, material, number, or other features of these items to achieve a particular characteristic that the designer may deem particularly desirable or helpful. These modifications are well within the knowledge of a designer having ordinary skill in the art. In addition, various embodiments may have disclosed a particular modification to a primary embodiment. A designer will be able to easily understand how to incorporate multiple changes to the design as disclosed and will also understand which changes cannot be incorporated in the same structure. A designer can do these substitutions without undue experimentation.

This detailed description in connection with the drawings is intended principally as a description of the presently preferred embodiments of the invention and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of any claims.

The invention claimed is:

1. An assembly for minimizing the disengagement of a chain from a chain ring, comprising:
   a bracket configured to be attached to a bicycle frame adjacent the chain ring, the bracket defining a first slot; and
   a chain guide assembly releasably mounted to the bracket, comprising:
   an inboard leg;
   an outboard leg;
   a first mating portion on the inboard leg;
   a second mating portion on the outboard leg;
       wherein the first mating portion and the second mating portion interfit with one another to connect the inboard leg to the outboard leg; and
   a lock having a first position, capable of positioning the inboard leg and the outboard leg relative to one another, and a second position releasing the inboard leg and the outboard leg from one another.

2. The assembly for minimizing the disengagement of a chain from a chain ring according to claim 1, wherein the first mating portion comprises a projection.

3. The assembly for minimizing the disengagement of a chain from a chain ring according to claim 2, wherein the second mating portion comprises a channel.

4. The assembly for minimizing the disengagement of a chain from a chain ring according to claim 3, wherein the projection is shaped to slide within the channel.

5. The assembly for minimizing the disengagement of a chain from a chain ring according to claim 1, wherein the lock comprises a finger on the outboard leg.

6. The assembly for minimizing the disengagement of a chain from a chain ring according to claim 5, wherein the lock comprises a finger on the inboard leg.

7. The assembly for minimizing the disengagement of a chain from a chain ring according to claim 5, wherein the lock comprises at least one magnet.

8. The assembly for minimizing the disengagement of a chain from a chain ring according to claim 7, wherein the lock further comprises a magnetically attracted material.

9. The assembly for minimizing the disengagement of a chain from a chain ring according to claim 3, wherein the channel is oriented substantially horizontally.

10. The assembly for minimizing the disengagement of a chain from a chain ring according to claim 3, wherein the channel has a closed end.

11. The assembly for minimizing the disengagement of a chain from a chain ring according to claim 1, wherein the chain guide assembly is releasably mounted to the bracket with at least one bolt, at least one sleeve, and at least one set screw.

12. The assembly for minimizing the disengagement from a chain ring according to claim 1, wherein the first mating portion includes a first projection and the second mating portion includes a first channel, the first projection and the first channel being configured to interfit and slide relative to one another.

13. The assembly for minimizing the disengagement from a chain ring according to claim 12, wherein the first mating portion includes a second projection and the second mating portion includes a second channel, the second projection and the second channel being configured to interfit and slide relative to one another.

14. The assembly for minimizing the disengagement from a chain ring according to claim 13, wherein the first projection and the second projection are integrally formed and the second projection comprises at least one lip extending away from the first projection.

15. The assembly for minimizing the disengagement from a chain ring according to claim 14, wherein the interfitting of the second projection and the second channel substantially restricts movement of the inboard leg and the outboard leg relative to one another in at least one direction.

16. The assembly for minimizing the disengagement from a chain ring according to claim 15, wherein the interfitting of the second projection and the second channel substantially restricts movement of the inboard leg and the outboard leg relative to one another in at least two directions.

17. The assembly for minimizing the disengagement from a chain ring according to claim 14, wherein the interfitting of the second projection and the second channel substantially restricts movement of the inboard leg and the outboard leg relative to one another in at least one direction when the lock is in the first position.

18. The assembly for minimizing the disengagement from a chain ring according to claim 15, wherein the interfitting of the second projection and the second channel substantially restricts movement of the inboard leg and the outboard leg relative to one another in at least two directions when the lock is in the first position.

19. The assembly for minimizing the disengagement from a chain ring according to claim 17, wherein the lock substantially restricts movement of the inboard leg and the outboard leg relative to one another in a direction different from the at least one direction when the lock is in the first position.

20. The assembly for minimizing the disengagement from a chain ring according to claim 18, wherein the lock substantially restricts movement of the inboard leg and the outboard leg relative to one another in a direction different from the at least two directions when the lock is in the first position.

* * * * *